Dec. 12, 1967    D. R. GENORD ET AL    3,357,134
VEHICLE BODY

Filed Oct. 23, 1965    2 Sheets-Sheet 1

INVENTORS
Donald R. Genord &
BY James D. Leslie

Herbert Furman
ATTORNEY

Dec. 12, 1967   D. R. GENORD ET AL   3,357,134
VEHICLE BODY
Filed Oct. 23, 1965   2 Sheets-Sheet 2

INVENTORS
Donald R. Genord &
BY  James D. Leslie

Herbert Furman
ATTORNEY

United States Patent Office 3,357,134
Patented Dec. 12, 1967

3,357,134
VEHICLE BODY
Donald R. Genord, Harper Woods, and James D. Leslie, Birmingham, Mich., assignors to General Motors Corporation, Detroit, Mich., a corporation of Delaware
Filed Oct. 23, 1965, Ser. No. 503,894
4 Claims. (Cl. 49—144)

ABSTRACT OF THE DISCLOSURE

A vehicle body includes a door window opening which is defined by the upper edge portion of a swingable vehicle door and by a body header and a body pillar. A ventilation window frame is mounted on the door adjacent the upper edge portion thereof for swinging movement about a horizontal axis. A ventilation window is pivotally mounted within the frame for movement about a vertical axis and opens and closes the forward portion of the body window opening. A coil compression spring seats between the door inner panel and the lower end of a rear elongated channel member of the ventilation window frame to bias the upper portion of the elongated frame member and the ventilation window inboard of the body by biasing the lower portion of the elongated frame member outboard of the body. A channel shaped weatherstrip is mounted on the body header for receiving the upper edge portion of a vertically movable door window when the door and the window is in closed position. The forward edge portion of the door window is guided for vertical movement by the elongated frame member and the door window is movable with the frame member as it moves about the pivotal axis of the ventilation window frame. When the door is in an open position and thereafter closed, the upper end of the elongated frame member contacts the inboard leg of the body header weatherstrip to swing the upper end of the frame member outwardly and upwardly with respect to the body to position the channel of the frame member in registry with the channel of the body header weatherstrip. If the door window is in open position when the door is closed, it can thereafter be moved within the body header weatherstrip channel. If the door window is in closed position when the door is closed, it moves with the frame member and the upper edge portion of the door window moves outwardly and upwardly within the body header weatherstrip channel.

---

This invention relates to vehicle bodies and more particularly to a window arrangement for vehicle bodies.

The window arrangement of this invention generally includes a guide member for one side edge portion of a vehicle window with the guide member being pivoted intermediate its ends on a vehicle body door and having the lower end thereof biased outwardly of the body to in turn bias the upper end thereof inwardly of the body. When the door is closed from an open position, the engagement of the upper end of the frame with the body swings the frame outwardly and upwardly to locate the frame in registry with a weatherstrip channel on the body header. If the door window is in a closed position when the door is closed, the upper edge portion of the window will move outwardly and upwardly and within the body header weatherstrip channel.

One feature of this invention is that it provides a window arrangement for vehicle bodies wherein a body ventilation window and door window are accurately located with respect to a body weatherstrip upon closing movement of the door. Another feature of this invention is that the ventilation window controls the position of the door window with respect to the body weatherstrip. A further feature of this invention is that the ventilation window is pivotally mounted on the body and is resiliently biased inboard of the body to locate the ventilation window and door window in a tilted position inboard of their normal position in the open position of the door. Yet another feature of this invention is that engagement of the ventilation window with the body weatherstrip as the door is closed swings the door window outwardly and upwardly with respect to the body to thereby locate the upper edge portion of the door window within the body weatherstrip channel.

These and other features of the invention will be readily apparent from the following specification and drawings wherein.

Figure 1:
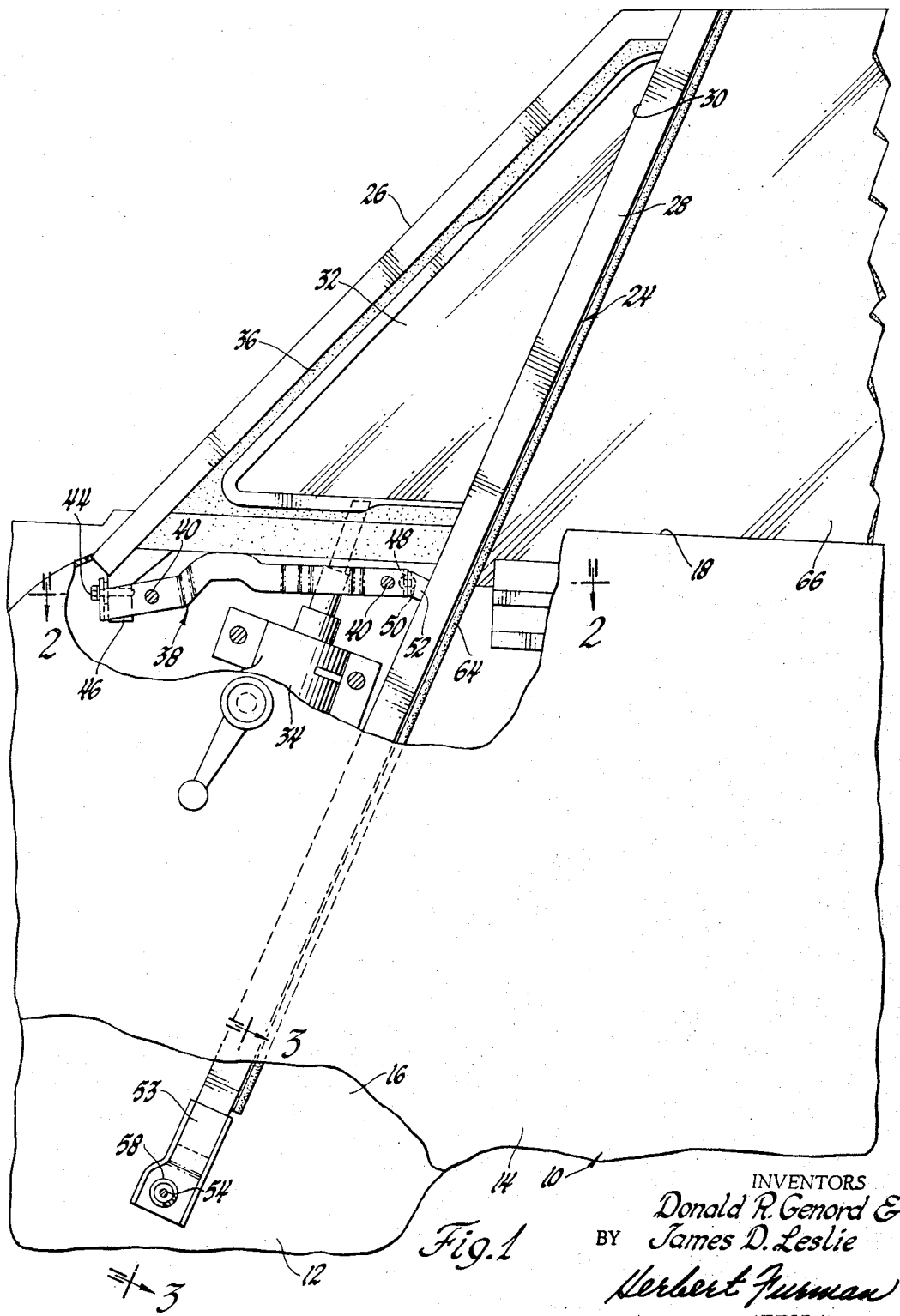
FIGURE 1 is a partially broken away, partial side elevational view of a vehicle body door embodying a window arrangement according to this invention.

Referring now particularly to FIGURE 1 of the drawings, a conventional vehicle body front door designated generally 10 includes an outer panel 12 and an inner panel 14 which are hem flanged together and located in spaced relationship to define a well 16. The door 10 is conventionally mounted on the body adjacent its forward edge portion for swinging movement between open and closed positions with respect to the body door opening.

Figure 4:
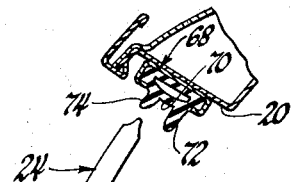
FIGURE 4 is a schematic indicating the position of the ventilation window in the open position of the door.
Figure 4:
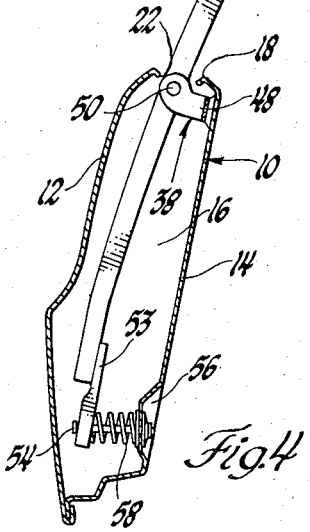
Figure 5:
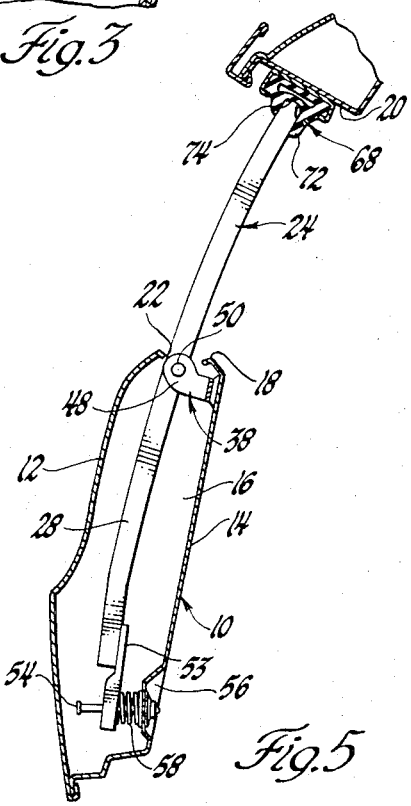
FIGURE 5 is a schematic indicating the position of the ventilation window in the closed position of the door.

The upper edge portion 18 of the door 10 is located in spaced relationship to the body roof rail or header 20, FIGURES 4 and 5, and defines therewith and with a conventional front body pillar, not shown, a window opening 22.

A ventilation window frame designated generally 24 includes a forward frame member 26 and a rearward channel frame member 28 which together define a ventilation window opening 30 at the forward portion of opening 22. A ventilation window 32 is conventionally mounted within the frame 24 for swinging movement about a generally vertically disposed axis between a closed position, as shown, and an open position, not shown, wherein the forward portion of the window 32 is disposed inwardly of the body and the rearward portion thereof is disposed outwardly of the body. A conventional manual window regulator assembly 34 is connected to the lower pivot shaft of the window 32 for moving the window. A weatherstrip 36 seals the window 32 to the frame 24 in the closed position thereof.

Figure 2:
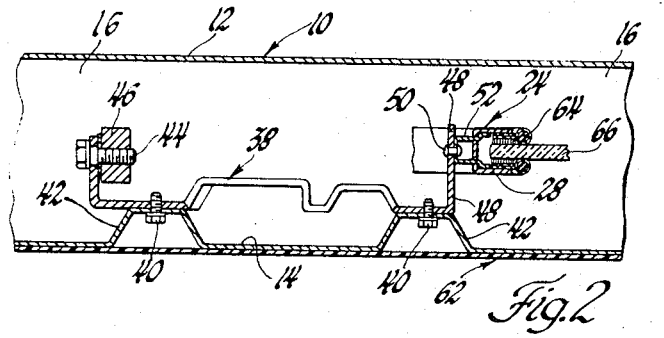
FIGURE 2 is a sectional view taken generally along the plane indicated by line 2—2 of FIGURE 1.

A generally U-shaped bracket 38, FIGURE 2, is adjustably bolted at 40 to embossments 42 of the door inner panel 14. The forward disposed leg of the bracket is pivoted at 44 to a depending lug or tab portion 46 of the forward frame member 26. The rearward leg 48 of the bracket is pivoted at 50 to a bracket 52 which is secured to the rear frame member 28 to thereby swingably mount the assembly 24 on the door 10 about a generally forwardly and downwardly disposed axis defined by the pivots 44 and 50.

It will be noted that the lower portion of the rear frame member 28 extends downwardly within the well 16 and has a generally U-shaped apertured bracket 53 secured to the lower end of the inboard leg thereof. A bolt 54 extends between the bracket 53 and an apertured embossment 56 of the inner panel 14. A compression spring 58 seats between the base wall of the bracket and the embossment to bias the lower portion of the frame member 28 outboard of the body and thereby bias the assembly 24 inboard of the body about the axis of the pivots 44 and 50.

A nut assembly 60 secures the bolt 54 to the embossment 56 and access to the notched threaded end of the bolt 54 through an opening in the inner panel trim assembly 62 allows the bolt 54 to be adjusted with respect to the nut assembly to thereby adjust the compression of spring 58 and locate frame member 28 relative to embossment 56.

A conventional weatherstrip channel 64 is mounted in the channel of frame member 28 to provide a guide for the forward edge portion of a vertically movable door window designated generally 66. Window 66 opens and closes the rearward portion of the window opening 22, and is mounted on the body for generally vertical movement between a closed position, as shown in FIGURE 1, and an open position, not shown, wherein the window is disposed within the well 16 of door 10. A conventional window regulator mechanism or a mechanism such as shown in Himka 2,969,977 may be used to mount the window 66 on the body.

As shown in FIGURES 4 and 5, a conventional channel weatherstrip assembly designated generally 68 is mounted on the body header 20 and body pillar, not shown, and includes a channel 70 defined by inner and outer legs 72 and 74, inner leg 72 depending more than the outer leg 74.

Figure 3:
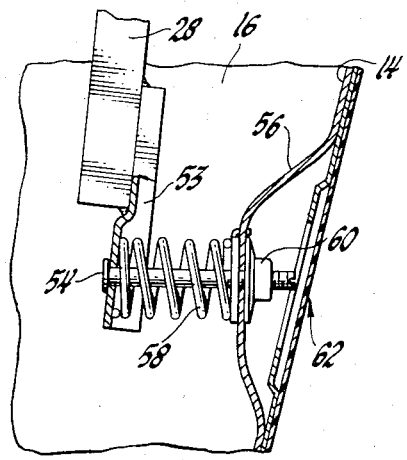
FIGURE 3 is an enlarged sectional view taken generally along the plane indicated by line 3—3 of FIGURE 1.

When the door 10 is in an open position as shown in FIGURES 3 and 4, the spring 58 biases the lower portion of member 28 outboard of the body and about the axis of pivots 44 and 50 to thereby bias the upper portion of member 28 and the assembly 24 inboard of the body. The engagement of the head of bolt 54 with bracket 53 locates the assembly 24 in an inwardly tilted position when the door is open. It will be noted that in this position of the door, the upper edge portion of the assembly 24 and the window 66 can move past the outer leg 74 of the weatherstrip 68.

When the door is closed, the upper edge portion of the assembly 24 moves past the weatherstrip leg 74 and engages the weatherstrip leg 72 prior to the time that the door reaches a closed position. It will be noted that the leg 72 is inboard of the axis through pivots 44 and 50 and also inboard of the lower end of member 28 in all positions of the door. As the door continues to move toward closed position, the upper edge portion of the assembly 24 is forced upwardly within the channel 70 of the weatherstrip as the assembly 24 moves relative to the door 10 about the axis of pivots 44 and 50 and spring 58 is compressed. The upper edge portion of the assembly 24 reaches its position in engagement with the weatherstrip leg 72 ahead of the time that the door reaches its closed position and can only move upwardly as the door continues to be moved to a closed position. In so moving, it wedges itself tightly within the weatherstrip channel 70 as assembly 24 swings relative to door 10 as the door moves to closed position.

It should also be noted that the axis through pivots 44 and 50 must either move in a horizontal plane or in a plane angled above the horizontal plane as the door moves between open and closed positions.

If the window 66 is not in a closed position, the engagement of the assembly 24 with the weatherstrip leg will still accurately locate the window 66 with respect to the weatherstrip channel so that the upper edge portion of the window will seat within the channel when the window is moved to closed position.

As the door moves from closed to open positions, release of the latch mechanism and partial opening movement of the door permits the spring 58 to bias the lower portion of member 28 outboard of the body to thereby bias the upper portion of member 28 and assembly 24 inboard of the body about the axis of pivots 44 and 50.

As the door continues to move toward open position, the upper edge portion of the assembly 24 will move down and out of the channel of the header portion of weatherstrip 68, below the leg 74, so that the door can be moved to a fully open position.

Thus this invention provides an improved window arrangement for vehicle bodies.

What is claimed is:

1. In combination with a vehicle body having a closure mounted thereon for pivotal movement about an axis between open and closed positions with respect to a body opening defined by the upper edge portion of the closure and a body header, a window movable between open and closed positions with respect to the body header, an elongated window guide member extending between the closure and the body header, means mounting the guide member intermediate the ends thereof on the closure for pivotal movement about an axis transverse of the pivotal axis of the closure, the guide member having a channel receiving a side edge portion of the window for guiding movement of the window between its open and closed positions and the window being movable with the guide member upon movement of the guide member about its pivotal axis, biasing means adjacent one end of the guide member biasing the one end of the guide member outboard with respect to its pivotal axis to bias the other end of the guide member inboard with respect to its pivotal axis and with respect to the body header, sealing means on the body header having a channel for receiving the upper edge portion of the window in the closed position thereof and the closed position of the closure, and means on the body engageable with the other end of the guide member upon movement of the closure from open to closed positions, the engagement of the other end of the guide member with the body means swinging the other end of the guide member outboard about the guide member pivotal axis against the biasing means to move the other end of the guide member outwardly and upwardly with respect to the body header and position the guide member channel in registry with the sealing means channel, the window being movable with the guide member to swing the upper edge portion of the window outwardly and upwardly to a position within the sealing means channel when the window is in closed position and the closure moves from open position to closed position.

2. The combination recited in claim 1 wherein the elongated window guide member forms part of a ventilation window frame which mounts a ventilation window movable between open and closed positions with respect to the frame.

3. The combination recited in claim 1 wherein the engageable means on the body include the inboard leg of the body sealing means.

4. The combination recited in claim 1 wherein the mounting means for the guide member are located adjacent the upper edge portion of the closure and within the closure.

References Cited

UNITED STATES PATENTS

| 1,945,821 | 2/1934 | Nicholson | 49—377 X |
| 2,145,659 | 1/1939 | Lane | 49—144 |
| 2,236,448 | 3/1941 | Roethel | 49—415 X |
| 2,304,640 | 12/1942 | Joachim | 49—414 X |
| 2,761,183 | 9/1956 | Renno | 49—144 X |
| 2,793,907 | 5/1957 | Hess et al. | 49—377 X |
| 3,273,285 | 9/1966 | Champion | 49—377 X |
| 3,273,286 | 9/1966 | Brissette et al. | 49—423 X |

FOREIGN PATENTS 469,813   12/1928   Germany.

DAVID J. WILLIAMOWSKY, *Primary Examiner.*

DENNIS L. TAYLOR, *Examiner.*